(12) United States Patent
Liu et al.

(10) Patent No.: US 10,663,789 B2
(45) Date of Patent: May 26, 2020

(54) LENS SUBSTRATE, LIQUID CRYSTAL LENS, AND LIQUID CRYSTAL GLASSES

(71) Applicant: BOE Technology Group Co., Ltd., Beijing (CN)

(72) Inventors: Dongni Liu, Beijing (CN); Lei Wang, Beijing (CN); Minghua Xuan, Beijing (CN); Li Xiao, Beijing (CN); Detao Zhao, Beijing (CN); Liang Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 45 days.

(21) Appl. No.: 16/199,720

(22) Filed: Nov. 26, 2018

(65) Prior Publication Data
US 2019/0346718 A1    Nov. 14, 2019

(30) Foreign Application Priority Data

May 9, 2018  (CN) .......................... 2018 1 0436351

(51) Int. Cl.
*G02F 1/1335* (2006.01)
*G02F 1/1362* (2006.01)

(52) U.S. Cl.
CPC .. *G02F 1/133526* (2013.01); *G02F 1/136286* (2013.01)

(58) Field of Classification Search
None
See application file for complete search history.

(56) References Cited

U.S. PATENT DOCUMENTS

2008/0151168 A1* 6/2008 Sekiguchi ................ G02B 3/14
349/142

* cited by examiner

*Primary Examiner* — Edward J Glick
*Assistant Examiner* — David Y Chung
(74) *Attorney, Agent, or Firm* — Arent Fox LLP; Michael Fainberg

(57) ABSTRACT

The disclosure discloses a lens substrate, a liquid crystal lens, and a liquid crystal glasses, where first annular electrodes and second annular electrodes of the lens substrate are arranged concentric with each other, and orthographic projections of the first annular electrodes onto a base substrate and orthographic projections of the second annular electrodes onto the base substrate are arranged alternately; where first wirings are electrically connected with the second annular electrodes through first via holes, and at least a first annular electrode adjacent to a part of the first via holes includes a place-giving pattern in an area corresponding to the part of the first via holes, and a smallest spacing between the place-giving pattern and its corresponding first via hole is no less than a preset distance.

20 Claims, 10 Drawing Sheets

LENS SUBSTRATE, LIQUID CRYSTAL LENS, AND LIQUID CRYSTAL GLASSES

CROSS-REFERENCE TO RELATED APPLICATION

This Application claims priority to Chinese Patent Application No. 201810436351.5, filed on May 9, 2018, the content of which is incorporated by reference in the entirety.

TECHNICAL FIELD

This disclosure relates to the field of display technologies, and particularly to a lens substrate, a liquid crystal lens, and a liquid crystal glasses.

DESCRIPTION OF THE RELATED ART

As the sciences and technologies are advancing, people are watching electronic screens for a longer and longer period of time every day, so their eyes get tired easily and their eyesight is becoming worse and worse. Further, many nearsighted people are also astigmatic, and may have different degrees of myopia in their different annual physical examinations, and they may also become presbyopic over years, so their eyesight has to be corrected with a new pair of glasses. In the existing markets of glasses, a frame of glasses may cost hundreds and even a thousand of RMB Yuan, and it typically takes several days to match the glasses, to grind the lenses, and to get the glasses, so the wearers have to wait for their glasses for a long time, thus resulting in a number of inconveniences thereof. As the technologies are advancing, a pair of liquid crystal glasses made of liquid crystal lenses has emerged, where an arrangement order of the liquid crystal is changed under the control of the driving voltage to thereby change focal lengths of the lenses. However a liquid crystal lens typically includes four layers of cylindrical lenses or two layers of circular lenses to modulate natural light so as to focus the natural light, therefore the lenses of the liquid crystal glasses fabricated as such have large thicknesses, and appear cumbersome.

SUMMARY

Embodiments of the disclosure provide a lens substrate, a liquid crystal lens, and a liquid crystal glasses.

In an aspect, the embodiments of the disclosure provide a lens substrate applicable to a liquid crystal lens, the lens substrate includes: a base substrate, and a wiring layer, a first annular electrode layer and a second annular electrode layer arranged in a stack on the base substrate in that order; wherein the wiring layer includes a plurality of first wirings, the first annular electrode layer includes a plurality of first annular electrodes, and the second annular electrode layer includes a plurality of second annular electrodes; and respective first annular electrodes are arranged concentric with respective second annular electrodes, and orthographic projections of the plurality of first annular electrodes onto the base substrate, and orthographic projections of the plurality of second annular electrodes onto the base substrate are arranged alternately; wherein the plurality of first wirings are electrically connected with the plurality of second annular electrodes through first via holes, wherein at least a first annular electrode adjacent to a part of the first via holes includes a place-giving pattern in an area corresponding to the part of the first via holes, and a smallest spacing between the place-giving pattern and its corresponding first via hole is no less than a preset distance.

In some embodiments, in the lens substrate according to the embodiments of the disclosure, a width, of a first annular electrode comprising a place-giving pattern, in an area corresponding to the place-giving pattern is less than that of the first annular electrode in the other area.

In some embodiments, in the lens substrate according to the embodiments of the disclosure a width of each of the plurality of second annular electrodes in an area corresponding to a corresponding first via hole is greater than that of the each of the plurality of second annular electrodes in the other area.

In some embodiments, in the lens substrate according to the embodiments of the disclosure, the orthographic projections of the plurality of first annular electrodes onto the base substrate abut with the orthographic projections of the plurality of second annular electrodes onto the base substrate.

In some embodiments, in the lens substrate according to the embodiments of the disclosure, all of the plurality of first annular electrodes and the plurality of second annular electrodes are divided into M electrode groups, and each of the M electrode groups includes N first annular electrodes and N second annular electrodes with alternately arranged orthographic projections, wherein M is a positive integer, and N is a positive integer; and all of n-th second annular electrodes in respective electrode groups are electrically connected with a same first wiring in a radius direction from a center of the plurality of second annular electrodes to an edge thereof, wherein n is an integer greater than or equal to 1, and less than or equal to N.

In some embodiments, in the lens substrate according to the embodiments of the disclosure, for respective place-giving patterns between first via holes corresponding to the same first wiring, widths of the respective place-giving patterns, and widths of gaps between every two adjacent place-giving patterns are arranged sequentially at a preset proportion in the radius direction from the center of the plurality of second annular electrodes to the edge thereof.

In some embodiments, in the lens substrate according to the embodiments of the disclosure, for respective place-giving patterns between first via holes corresponding to the same first wiring, widths of the respective place-giving patterns are same as widths of gaps between every two adjacent place-giving patterns.

In some embodiments, in the lens substrate according to the embodiments of the disclosure, all of first annular electrodes between first via holes corresponding to the same first wiring include place-giving patterns.

In some embodiments, in the lens substrate according to the embodiments of the disclosure, a first annular electrode most adjacent to the part of the first via holes includes a place-giving pattern in an area corresponding to the part of the first via holes.

In some embodiments, in the lens substrate according to the embodiments of the disclosure, the wiring layer further includes a plurality of second wirings arranged insulated from the plurality of first wirings; and all of n-th first annular electrodes in the respective electrode groups are electrically connected with a same second wiring in the radius direction from the center of the plurality of second annular electrodes to the edge thereof.

In some embodiments, in the lens substrate according to the embodiments of the disclosure, respective first wirings and respective second wirings extend respectively in the radius direction from the center of the plurality of second annular electrodes to the edge thereof; and the plurality of first wirings and the plurality of second wirings are arranged alternately, and a same angle is set between reverse extension lines of orthographic projections of each pair of adjacent first and second wirings onto the base substrate.

In some embodiments, in the lens substrate according to the embodiments of the disclosure, a width of each of the plurality of first annular electrodes in an area corresponding to a corresponding second via hole is greater than that of the each of the plurality of first annular electrodes in the other area.

In another aspect, the embodiments of the disclosure further provide a liquid crystal lens including a lens substrate, wherein the liquid crystal lens includes: a base substrate; and a wiring layer, a first annular electrode layer, and a second annular electrode layer arranged in a stack on the base substrate in that order; wherein the wiring layer includes a plurality of first wirings, the first annular electrode layer includes a plurality of first annular electrodes, and the second annular electrode layer includes a plurality of second annular electrodes; and respective first annular electrodes are arranged concentric with respective second annular electrodes, and orthographic projections of the plurality of first annular electrodes onto the base substrate, and orthographic projections of the plurality of second annular electrodes onto the base substrate are arranged alternately; wherein the plurality of first wirings are electrically connected with the plurality of second annular electrodes through first via holes, wherein at least a first annular electrode adjacent to a part of the first via holes includes a place-giving pattern in an area corresponding to the part of the first via holes, and a smallest spacing between the place-giving pattern and its corresponding first via hole is no less than a preset distance.

In some embodiments, in the liquid crystal lens according to the embodiments of the disclosure, a width, of a first annular electrode comprising a place-giving pattern, in an area corresponding to the place-giving pattern is less than that of the first annular electrode in the other area.

In some embodiments, in the liquid crystal lens according to the embodiments of the disclosure, a width of each of the plurality of second annular electrodes in an area corresponding to a corresponding first via hole is greater than that of the each of the plurality of second annular electrodes in the other area.

In some embodiments, in the liquid crystal lens according to the embodiments of the disclosure, all of the plurality of first annular electrodes and the plurality of second annular electrodes are divided into M electrode groups, and each of the M electrode groups includes N first annular electrodes and N second annular electrodes with alternately arranged orthographic projections, wherein M is a positive integer, and N is a positive integer; and all of n-th second annular electrodes in respective electrode groups are electrically connected with a same first wiring in a radius direction from a center of the plurality of second annular electrodes to an edge thereof, wherein n is an integer greater than or equal to 1, and less than or equal to N.

In some embodiments, in the liquid crystal lens according to the embodiments of the disclosure, for respective place-giving patterns between first via holes corresponding to the same first wiring, widths of the respective place-giving patterns, and widths of gaps between every two adjacent place-giving patterns are arranged sequentially at a preset proportion in the radius direction from the center of the plurality of second annular electrodes to the edge thereof.

In some embodiments, in the liquid crystal lens according to the embodiments of the disclosure, a first annular electrode most adjacent to the part of the first via holes includes a place-giving pattern in an area corresponding to the part of the first via holes.

In still another aspect, the embodiments of the disclosure further provide a liquid crystal glasses including the liquid crystal lens according to the embodiments of the disclosure.

In some embodiments, in the liquid crystal glasses according to the embodiments of the disclosure, the liquid crystal glasses further include: a detection circuit and a control circuit, wherein: the detection circuit is configured to detect a distance between the liquid crystal glasses and an eyeball of a human eye, and to transmit the distance to the control circuit; and the control circuit is configured to determine a focal length of the human eye according to the distance, and to determine voltage to be provided to the respective first annular electrodes and the respective second annular electrodes according to the focal length of the human eye to control a focal length of the liquid crystal glasses.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

In order to structure a liquid crystal glasses with a low weight and a small thickness, such a liquid crystal glasses has emerged that a Fresnel lens is formed to modulate a focus for focusing ambient light, where a lens of the liquid crystal glasses generally includes a lens substrate and an opposite substrate arranged opposite to each other, and a liquid crystal layer encapsulated between the lens substrate and the opposite substrate.

Figure 1:
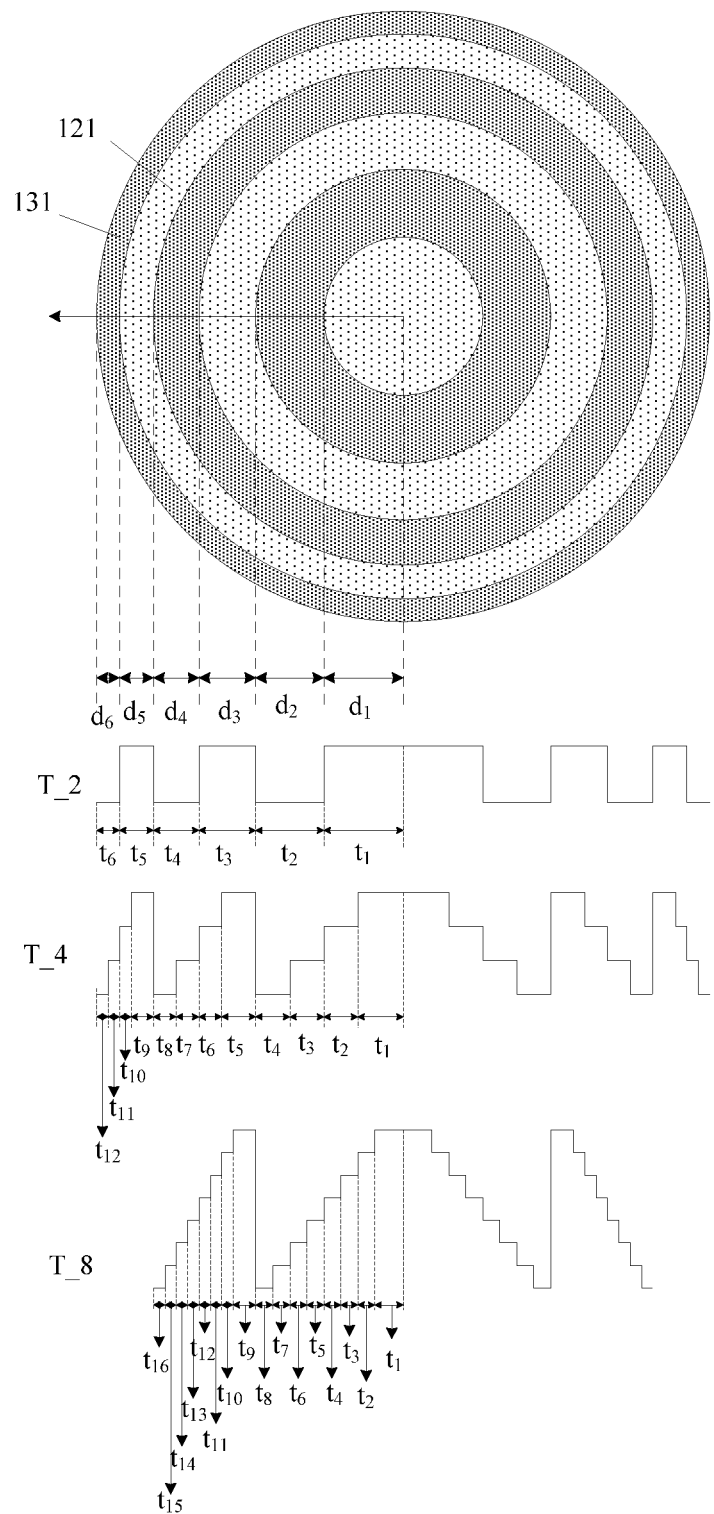
FIG. 1 is a schematic structural diagram of a lens substrate in the related art in a top view.
Figure 2A:
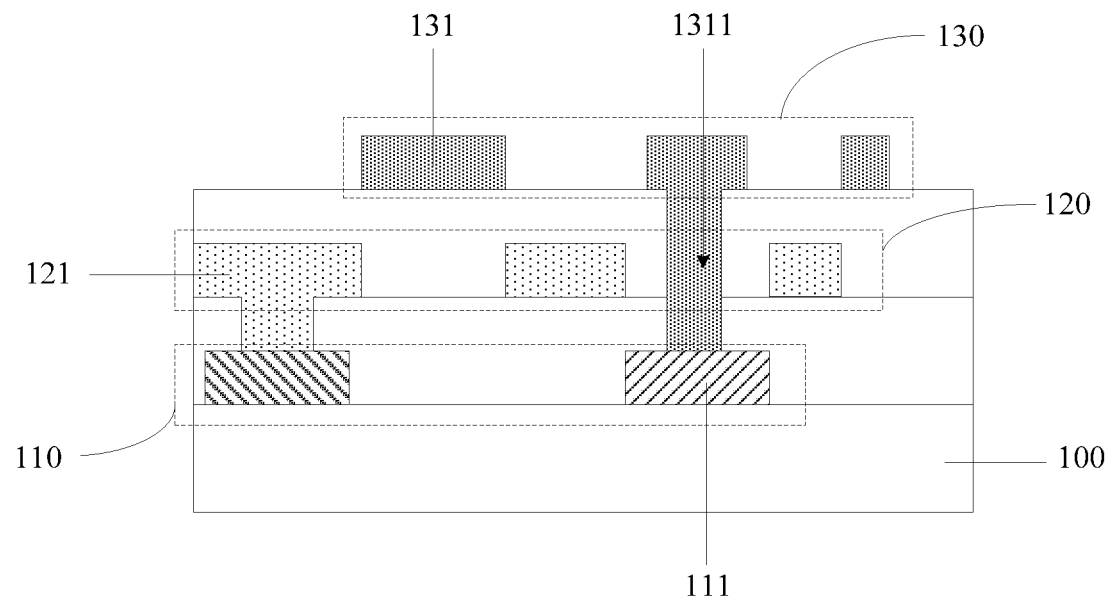
FIG. 2A is a first schematic structural diagram of the lens substrate in the related art in a sectional view.

As illustrated in FIG. 1 and FIG. 2A, a lens substrate in the related art generally includes: a base substrate 100, and a wiring layer 110, a first annular electrode layer 120 and a second annular electrode layer 130 arranged in a stack on the base substrate 100 in that order, where the wiring layer 110 includes a plurality of first wirings 111, the first annular electrode layer 120 includes a plurality of first annular electrodes 121, and the second annular electrode layer 130 includes a plurality of second annular electrodes 131, where respective first annular electrodes 121 are arranged concentric with respective second annular electrodes 131, and orthographic projections of the first annular electrodes 121 onto the base substrate 100 and orthographic projections of the second annular electrodes 131 onto the base substrate 100 are arranged alternately; and the first wirings 111 are electrically connected with the second annular electrodes 131 through first via holes 1311 so that an effect of the lens substrate is equivalent to that of a Fresnel zone plate. In this way, when the lens substrate is applied to a liquid crystal lens, voltage is applied respectively to the first annular electrodes 121 and the second annular electrodes 131 so that an order in which liquid crystal is arranged is changed with the driving voltage so that the liquid crystal lens can be equivalent to a Fresnel zone plate, and function as a lens of glasses.

Generally, in order to enable the lens substrate to be equivalent to a Fresnel zone plate, as illustrated in FIG. 1, a radius $r_j$ of each annular electrode is defined in an equation of $r_j=\sqrt{jf\lambda}$, where j represents a sequence number of each annular electrode along a radius direction from a center of the annular electrodes to an edge thereof, f represents a focal length, and $\lambda$ represents a wavelength of light, so a width $d_j$ of each annular electrode is defined in an equation of $d_j=r_j-r_{j-1}$, where j=1, 2, 3, 4, 5, 6 as illustrated in FIG. 1 by way of an example.

Furthermore, generally the annular electrodes are also arranged in a step pattern, e.g., including two, four, eight, etc., steps. When two steps are arranged, steps $t_1$, $t_3$, $t_5$ correspond respectively to the first annular electrodes 121, and $t_2$, $t_4$, $t_6$ correspond respectively to the second annular electrodes 131, as illustrated with T_2 in FIG. 1, where widths of the steps $t_1$ to $t_6$ correspond respectively to $d_1$ to $d_6$. Furthermore, the same voltage is applied to the first annular electrodes 121 corresponding to the steps $t_1$, $t_3$, $t_5$, and the same voltage is applied to the second annular electrodes 131 corresponding to the steps $t_2$, $t_4$, $t_6$.

When four steps are arranged, steps $t_1$, $t_3$, $t_5$, $t_7$, $t_9$, $t_{11}$ correspond respectively to the first annular electrodes 121, and $t_2$, $t_4$, $t_6$, $t_8$, $t_{10}$, $t_{12}$ correspond respectively to the second annular electrodes 131, as illustrated with T_4 in FIG. 1, where the same voltage is applied to first annular electrodes 121 corresponding to the steps $t_1$, $t_5$, $t_9$, the same voltage is applied to second annular electrodes 131 corresponding to the steps $t_2$, $t_6$, $t_{10}$, the same voltage is applied to first annular electrodes 121 corresponding to the steps $t_3$, $t_7$, $t_{11}$, and the same voltage is applied to second annular electrodes 131 corresponding to the steps $t_4$, $t_8$, $t_{12}$; and different voltage is applied to annular electrodes corresponding to the steps $t_1$ to $t_4$. Furthermore, a sum of widths of the steps $t_1$ and $t_2$ is $d_1$, a sum of widths of the steps $t_3$ and $t_4$ is $d_2$, the width of the step $t_1$ is greater than the width of the step $t_2$, and respective widths of respective steps $t_2$ to $t_4$ are the same. Alike, a sum of widths of the steps $t_5$ and $t_6$ is $d_3$, a sum of widths of the steps $t_7$ and $t_8$ is $d_4$, the width of the step $t_5$ is greater than the width of the step $t_6$, and respective widths of respective steps $t_6$ to $t_8$ are the same; a sum of widths of the steps $t_9$ and $t_{10}$ is $d_5$, a sum of widths of the steps $t_{11}$ and $t_{12}$ is $d_6$, the width of the step $t_9$ is greater than the width of the step $t_{10}$, and respective widths of respective steps $t_{10}$ to $t_{11}$ are the same. Further, the same description will apply to the other steps, so a repeated description thereof will be omitted here.

When eight steps are arranged, steps $t_1$, $t_3$, $t_5$, $t_7$, $t_9$, $t_{11}$, $t_{13}$, $t_{15}$ correspond respectively to the first annular electrodes 121, and $t_2$, $t_4$, $t_6$, $t_8$, $t_{10}$, $t_{12}$, $t_{14}$, $t_{16}$ correspond respectively to the second annular electrodes 131, as illustrated with T_8 in FIG. 1, where the same voltage is applied to first annular electrodes 121 corresponding to the steps $t_1$ and $t_9$, and the same voltage is applied to second annular electrodes 131 corresponding to the steps $t_2$ and $t_{10}$; and the same description will apply to the other steps, so a repeated description thereof will be omitted here. Furthermore, different voltage is applied to annular electrodes corresponding to the steps $t_1$ to $t_8$. Furthermore, a sum of widths of the steps $t_1$ to $t_4$ is $d_1$, a sum of widths of the steps $t_5$ to $t_8$ is $d_2$, the width of the step $t_1$ is greater than the width of the step $t_2$, and respective widths of respective steps $t_2$ to $t_8$ are the same. Alike, a sum of widths of the steps $t_9$ to $t_{12}$ is $d_3$, a sum of widths of the steps $t_{13}$ to $t_{16}$ is $d_4$, the width of the step $t_9$ is greater than the width of the step $t_{10}$, and respective widths of respective steps $t_{10}$ to $t_{16}$ are the same. Further, the same description will apply to the other steps, so a repeated description thereof will be omitted here.

Figure 2B:
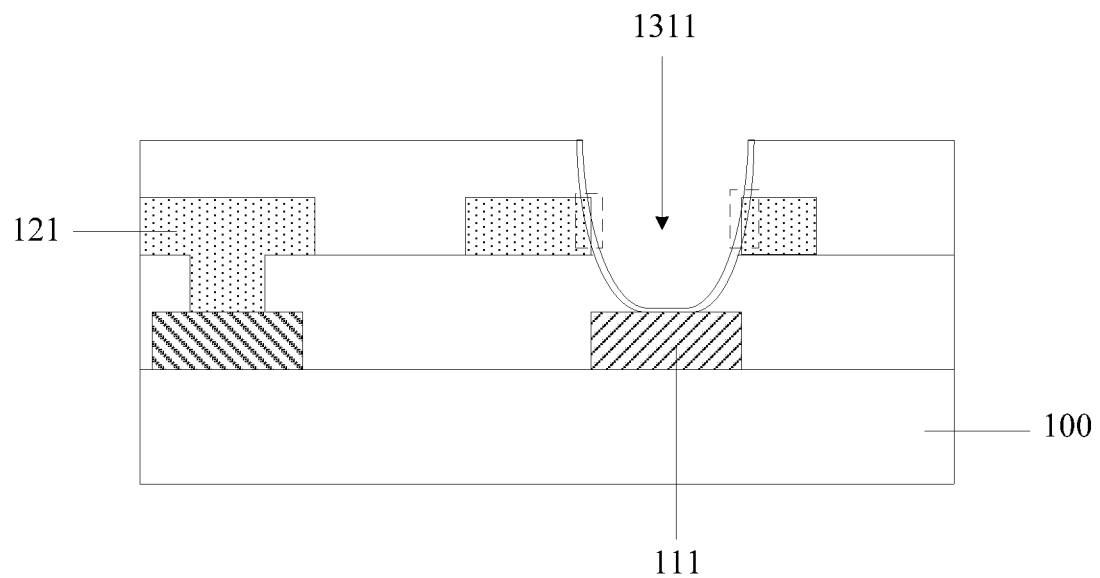
FIG. 2B is a second schematic structural diagram of the lens substrate in the related art in a sectional view.

As the degree of the liquid crystal lens is increasing, the focal length thereof is decreasing so that there are increasing numbers, and thus decreasing widths, of the first annular electrodes 121 and the second annular electrodes 131. As illustrated in FIG. 2B, since the second annular electrodes 131 are electrically connected with the first wirings 111 through the first via holes 1311, a width of a gap between the first annular electrodes 121 adjacent to the second annular electrodes 131 is decreasing as the widths of the second annular electrodes 131 are decreasing. However, there is such a limiting process that a width of each first via hole 1311 cannot further decrease after the width thereof reach an extreme (e.g., 2.2 μm), so that the width of each first via hole 1311 is greater than a width of a gap between adjacent first annular electrodes 121 as illustrated in FIG. 2B. In this way, when the first via holes 1311 are formed, the first annular electrodes 121 may be exposed as illustrated in the dotted boxes in FIG. 2B, so that when the second annular electrodes 131 are formed, the second annular electrodes 131 may be short-circuited with the first annular electrodes 121, thus degrading the quality of the liquid crystal lens.

In view of this, the embodiments of the disclosure provide a lens substrate so as to avoid the electrodes from being short-circuited.

In order to make the objects, technical solutions, and advantages of the disclosure more apparent, particular implementations of the lens substrate, the liquid crystal lens, and the liquid crystal glasses according to the embodiments of the disclosure will be described below in details with reference to the drawings. It shall be appreciated that the preferable embodiments to be described below are only intended to illustrate and explain the disclosure, but not to limit the disclosure thereto. Furthermore the embodiments of the disclosure and the features in the embodiments can be combined with each other unless they conflict with each other. Moreover the thicknesses, sizes, and shapes of respective layers in the drawings are not intended to reflect any real proportion of the lens substrate, the liquid crystal lens, and the liquid crystal glasses, but only intended to illustrate the content of the disclosure.

Figure 3:
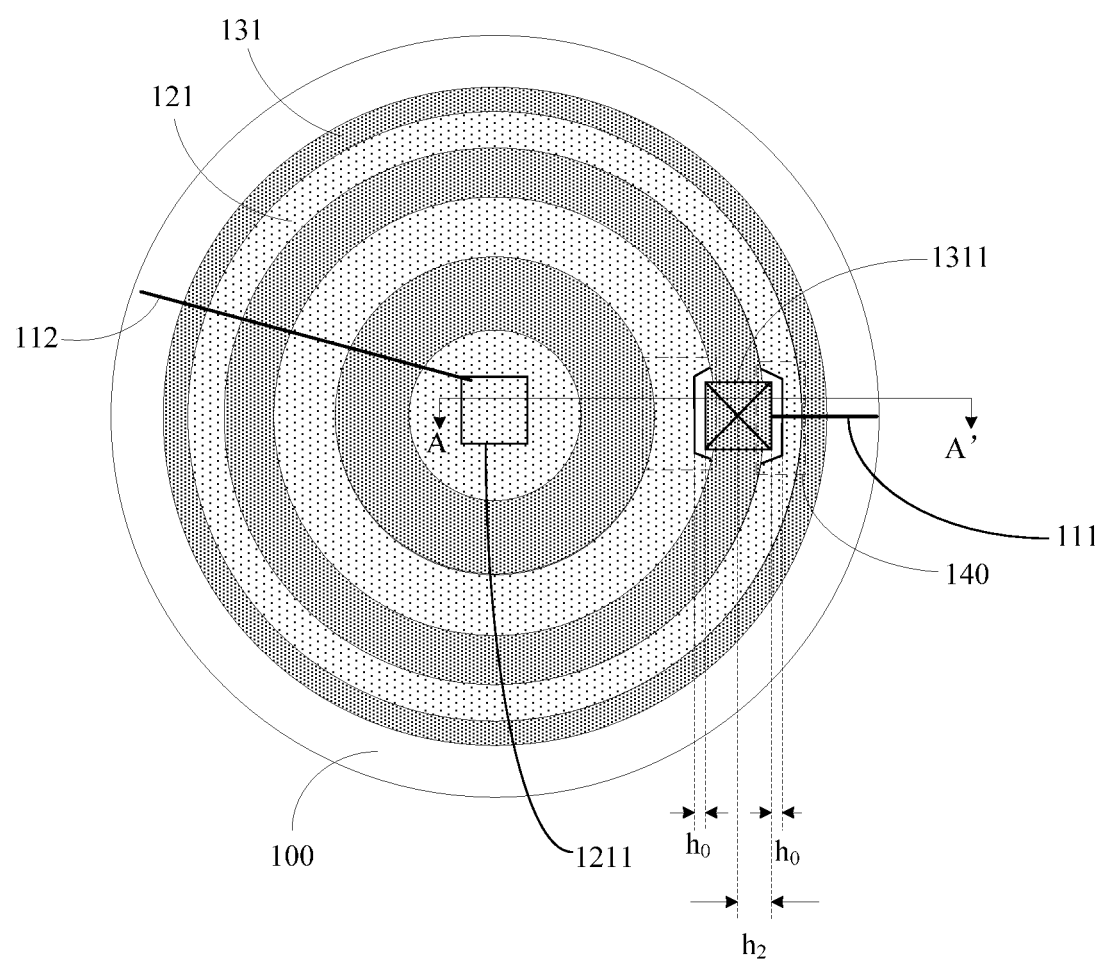
FIG. 3 is a first schematic structural diagram of a lens substrate according to the embodiments of the disclosure in a top view.
Figure 4:
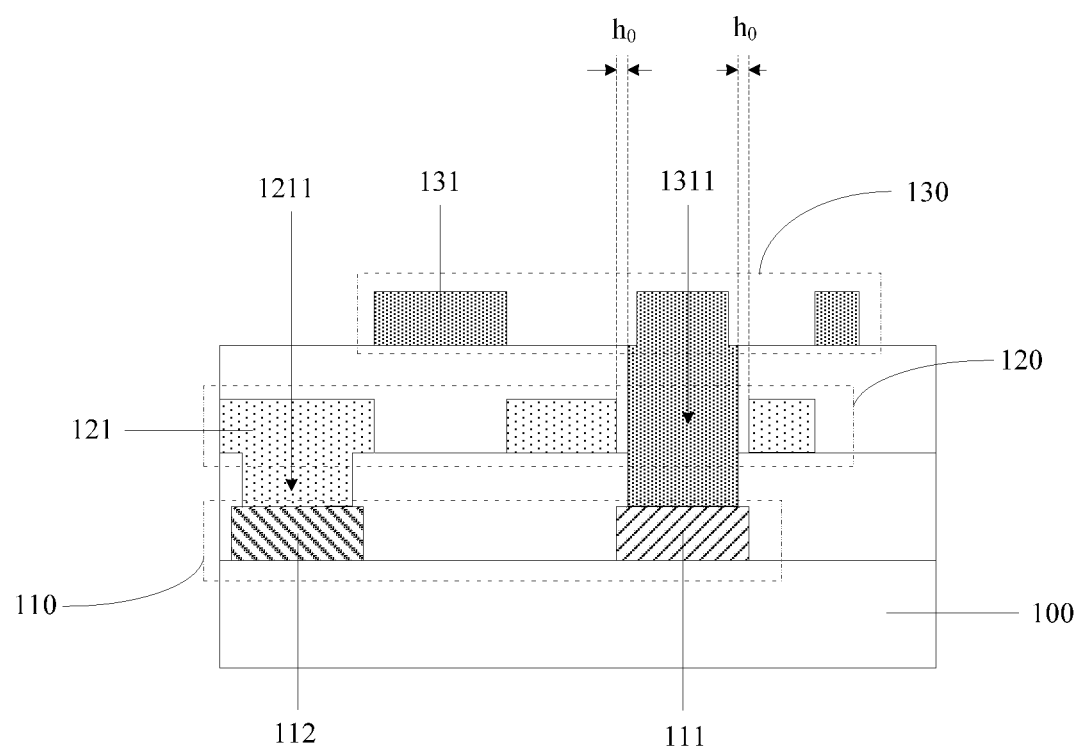
FIG. 4 is a schematic structural diagram of the lens substrate as illustrated in FIG. 3 along an AA' direction in a sectional view.

A lens substrate according to the embodiments of the disclosure can be applicable to a liquid crystal lens. As illustrated in FIG. 3 and FIG. 4, the lens substrate includes: a base substrate 100, and a wiring layer 110, a first annular electrode layer 120 and a second annular electrode layer 130 arranged in a stack on the base substrate 10 in that order, where the wiring layer 110 includes a plurality of first wirings 111, the first annular electrode layer 120 includes a plurality of first annular electrodes 121, and the second annular electrode layer 130 includes a plurality of second annular electrodes 131; and respective annular electrodes 121 are arranged concentric with respective second annular electrodes 131, and orthographic projections of the first annular electrodes 121 onto the base substrate 100 and orthographic projections of the second annular electrodes 131 onto the base substrate 100 are arranged alternately. Furthermore, the first wirings 111 are electrically connected with the second annular electrodes 131 through first via holes 1311, where at least a first annular electrode 121 adjacent to a part of the first via holes 1311 includes a place-giving pattern 140 in an area corresponding to the part of the first via holes 1311 (as denoted in the dotted box in FIG. 3). The smallest spacing $h_0$ between each place-giving pattern 140 and its corresponding via hole 1311 is no less than a preset distance $h_1$, where the smallest spacing refers to the shortest one of respective distances between edges of an orthographic projection of the place-giving pattern 140 onto the base substrate 100, and edges of an orthographic projection of its corresponding via hole 1311 onto the base substrate 100.

In the lens substrate according to the embodiments of the disclosure, the first annular electrodes are arranged concentric with the second annular electrodes, and the orthographic projections of the first annular electrodes onto the base substrate and the orthographic projections of the second annular electrodes onto the base substrate are arranged alternately, so that the effect of the lens substrate is equivalent to that of a Fresnel zone plate. Furthermore, at least the first annular electrodes adjacent to a part of the first via holes include the place-giving patterns in the areas corresponding to the part of first via holes, and the smallest spacing between the place-giving patterns and their corresponding first via holes is no less than the preset distance, so that when the second annular electrodes become narrow, the place-giving patterns are arranged to reserve areas with an appropriate size for the first via holes, so the first via holes can be fabricated without exposing the first annular electrodes, to thereby avoid the electrodes from being short-circuited, so as to improve the degree of the liquid crystal lens.

In some embodiments, in the lens substrate according to the embodiments of the disclosure, as illustrated in FIG. 3 and FIG. 4, the wiring layer 110 further includes a plurality of second wirings 112 arranged insulated from respective first wirings 111, where the second wirings 112 are electrically connected with the first annular electrodes 121 through second via holes 1211. In this way, driving signals are transmitted to the electrically connected first annular electrodes 121 through the second wirings 112, and driving signals are transmitted to the electrically connected second annular electrodes 131 through the first wirings 111, so that when the lens substrate is applied to a liquid crystal lens in a liquid crystal glasses, liquid crystal can be driven to be deflected to an equivalent concentric circle effect to that of a Fresnel lens to thereby match with the degree of a human eye.

In some embodiments, in order to further enable the first annular electrodes to be electrically connected with the second wirings, in the lens substrate according to the embodiments of the disclosure, a width of each first annular electrode 121 in an area corresponding to its corresponding second via hole 1211 is greater than that of the first annular electrode 121 in the other area, so that the first annular electrodes 121 can be formed to cover the second via holes 1211 completely via the material thereof to thereby avoid the first annular electrodes 121 from being disconnected with the second wirings 112.

In some embodiments, in the lens substrate according to the embodiments of the disclosure, a first insulation layer is arranged between the wiring layer and the first annular electrode layer, and a second insulation layer is arranged between the first annular electrode layer and the second annular electrode layer, where the first wirings are electrically connected with their corresponding second annular electrodes through the first via holes extending through the first insulation layer and the second insulation layer, and the second wirings are electrically connected with their corresponding first annular electrodes through the second via holes extending through the first insulation layer. Furthermore, a material of the wiring layer can be a metal material, e.g., gold, silver, aluminum, etc. The first annular electrode layer and the second annular electrode layer can be made of a transparent conductive material, e.g., indium tin oxide (ITO), and the first insulation layer and the second insulation layer can be made of an insulation material, e.g., polyvinyl chloride (PVC).

In some embodiments, in the lens substrate according to the embodiments of the disclosure, the preset distance $h_1$ can be derived empirically. Generally, a shape of each formed via hole can be a circle, a rectangle, a polygon, etc. The shape of each formed via hole will be a rectangle hereinafter by way of an example. In a practical fabrication process, in order to enable the second annular electrodes to be electrically connected with the first wirings, but not to be short-circuited with the first annular electrodes, a smallest size $h_2$ of each first via hole which can be fabricated is an extreme available in the process, and satisfying the condition above; where, as illustrated in FIG. 3, the smallest size $h_2$ refers to the smallest one of distances between a center of each first via hole 1311 and edges thereof. For example, $h_2$ can be set to be 2.2 μm, and the preset distance $h_1$ can be set to be 0.6 μm, so that the first annular electrodes can be avoided from being short-circuited with the second annular electrodes. In a practical application, the smallest sizes of each via hole which can be formed under different process conditions are different, so the preset distance can be designed as needed in reality, although the embodiments of the disclosure will not be limited thereto.

Figure 5:
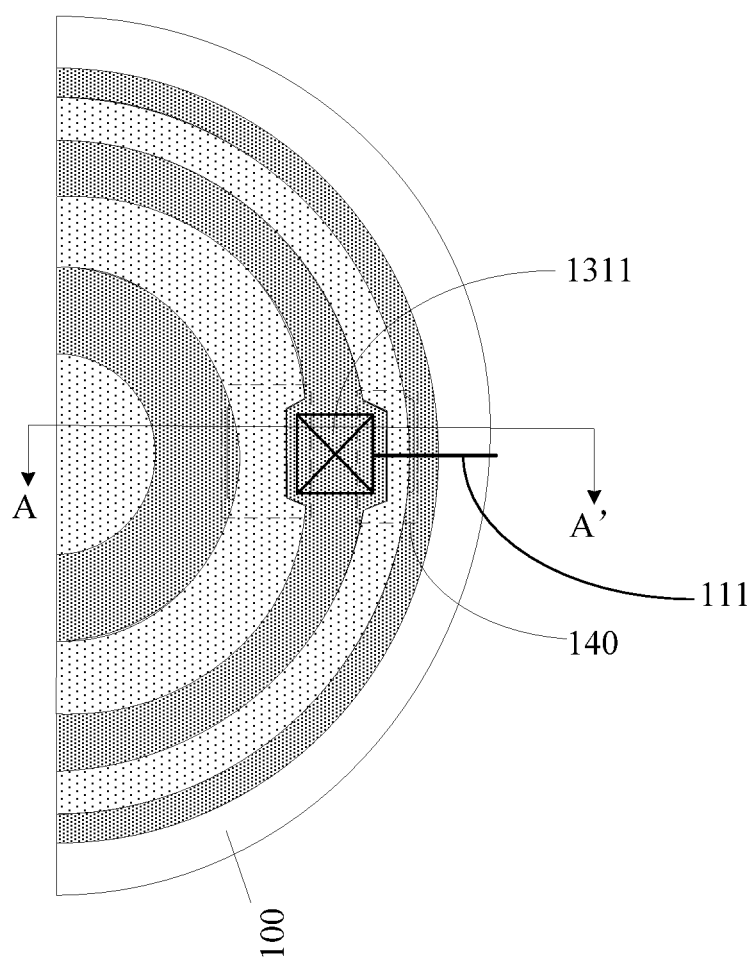
FIG. 5 is a second schematic structural diagram of the lens substrate according to the embodiments of the disclosure in a top view.
Figure 7:
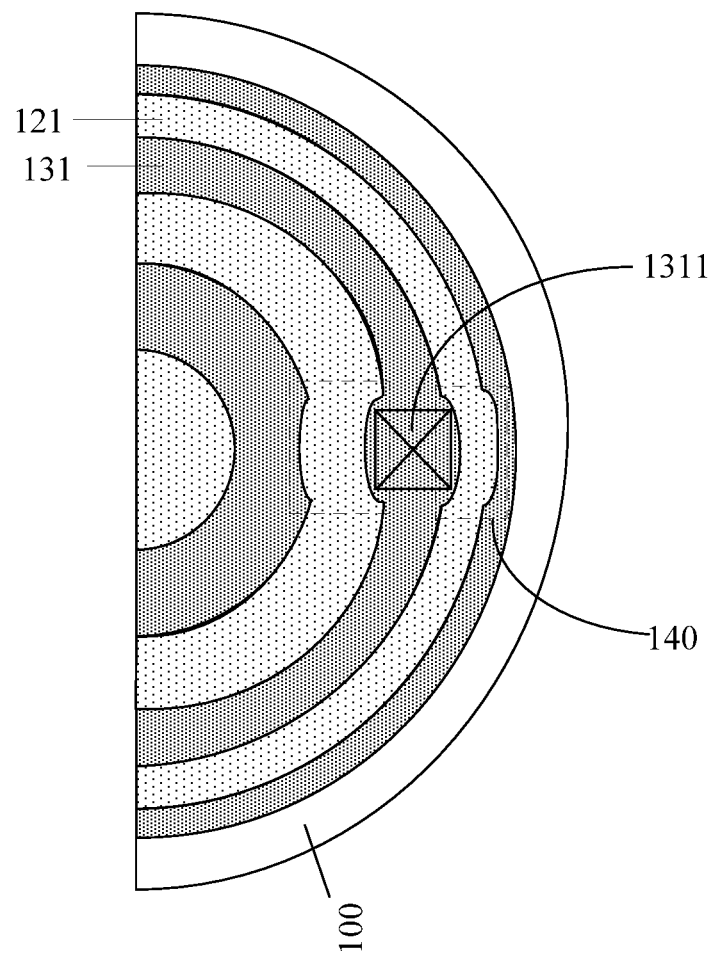
FIG. 7 is a third schematic structural diagram of the lens substrate according to the embodiments of the disclosure in a top view.

In some embodiments, in the lens substrate according to the embodiments of the disclosure, each place-giving pattern has many kinds of structures, and in the embodiments of the disclosure, a width, of each first annular electrode including a place-giving pattern, in an area corresponding to the place-giving pattern is less than that of the first annular electrode in the other area to thereby reserve a space needed for fabricating its corresponding first via hole. As illustrated in FIG. 3, for example, each place-giving pattern 140 is a pattern recessing inward, that is, an area of a first annular electrode 121 facing a first via hole 1311 is arranged with a recess so that the width of the first annular electrode 121 in the area corresponding to the place-giving pattern 140 is less than that of the first annular electrode 121 in the other area, where an orthographic projection of the recess onto the base substrate 100 can be an inverted trapezoid, a semi-circle, a semi-ellipse, etc. As illustrated in FIG. 5, each place-giving pattern 140 can alternatively be a pattern recessing inward and protruding outward at the same time, that is, an area of a first annular electrode 121 facing a first via hole 1311 is arranged with a recess, and an area of the first annular electrode 121 facing away from the first via hole 1311 is arranged with a protrusion, so that the width of the first annular electrode 121 in the area corresponding to the place-giving pattern 140 is less than that of the first annular electrode 121 in the other area, where an orthographic projection of the recess onto the base substrate 100 can be an inverted trapezoid, a semi-circle, a semi-ellipse, etc., and an orthographic projection of the protrusion onto the base substrate 100 can also be an inverted trapezoid, a semi-circle, a semi-ellipse, etc., although the embodiments of the disclosure will not be limited thereto. Of course, each pattern recessing inward can alternatively be an arc with some curvature, and each pattern protruding outward can also be an arc with some curvature. For example, as illustrated in FIG. 7, a shape of each place-giving pattern 140 is an arc, and a width of an area corresponding to a place-giving pattern 140 of a first annular electrode 121 is the same with that of the other area of the first annular electrode 121. Of course, in a practical application, the shape of each place-giving pattern can be designed as needed in reality, although the embodiments of the disclosure will not be limited thereto.

Figure 6:
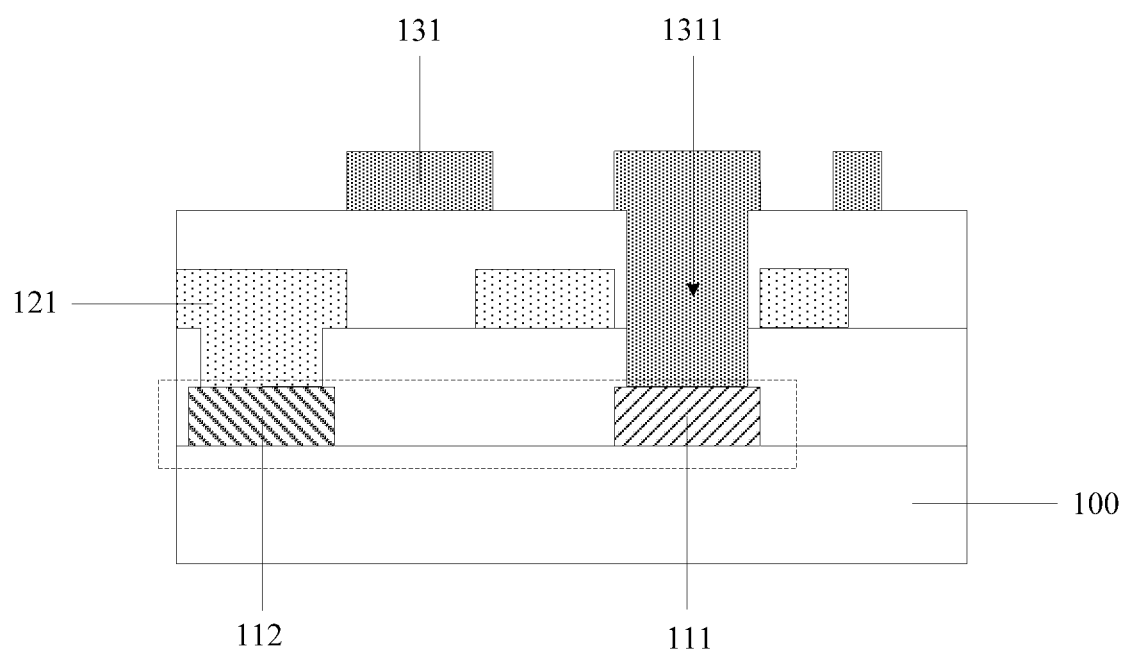
FIG. 6 is a schematic structural diagram of the lens substrate as illustrated in FIG. 5 along an AA' direction in a sectional view.

In some embodiments, in order to further enable the second annular electrodes to be electrically connected with the first wirings, in the lens substrate according to the embodiments of the disclosure, as illustrated in FIG. 5 and FIG. 6, a width of each second annular electrode 131 in an area corresponding to its corresponding first via hole 1311 is greater than that of the second annular electrode 131 in the other area, so that the second annular electrodes 131 can be formed to cover the first via holes 1311 completely via the material thereof to thereby avoid the second annular electrodes 131 from being disconnected with the first wirings 111.

Following the equation of $d_j$, there is a larger width of a second annular electrode closer to the center of the annular electrodes, so that it can be avoided from being short-circuited. Accordingly in some embodiments, when a width of a second annular electrode is less than $2(h_1+h_2)$, a first annular electrode adjacent to a first via hole corresponding to the second annular electrode is arranged with a place-giving pattern; and when a width of a second annular electrode is not less than $2(h_1+h_2)$, a first annular electrode adjacent to a first via hole corresponding to the second annular electrode may not be arranged with a place-giving pattern.

In some embodiments, in the lens substrate according to the embodiments of the disclosure, a first annular electrode adjacent to a first via hole refers to a first annular electrode adjacent directly to the first via hole, i.e., a first annular electrode most adjacent to the first via hole, so that the first annular electrode most adjacent to the first via hole is arranged with a place-giving pattern in an area corresponding to the first via hole; or a first annular electrode adjacent to a first via hole further includes a first annular electrode adjacent indirectly to the first via hole, e.g., a first annular electrode adjacent to the first via hole includes a first annular electrode most adjacent to the first via hole, and a first annular electrode next most adjacent to the first via hole, although the embodiments of the disclosure will not be limited thereto.

In some embodiments, in the lens substrate according to the embodiments of the disclosure, for a first annular electrode and a second annular electrode with adjacent orthographic projections, the orthographic projections of the first annular electrode and the second annular electrode onto the base substrate abut with each other, or the orthographic projections of the first annular electrode and the second annular electrode onto the base substrate are spaced by an electrode, or the orthographic projections of the first annular electrode and the second annular electrode onto the base substrate overlap with each other. In some embodiments, as illustrated in FIG. 3, an orthographic projection of a first annular electrode 121 onto the base substrate 100 abuts with an orthographic projection of a second annular electrode 131 most adjacent to the first annular electrode 121 onto the base substrate 100, that is, a boundary of the orthographic projection of the first annular electrode 121 onto the base substrate 100 overlaps completely with a boundary of the orthographic projection of the second annular electrode 131 most adjacent to the first annular electrode 121 onto the base substrate 100. Furthermore, in order to function as the glasses, the first annular electrodes and the second annular electrodes arranged on the base substrate are typically of the micrometer order, e.g., 5.6 μm or less, so an influence of the first annular electrodes including the place-giving patterns upon the degree of the liquid crystal lens can be neglected.

In some embodiments, in the lens substrate according to the embodiments of the disclosure, as illustrated in FIG. 3, the second annular electrodes 131 are shaped as circular rings. And since the widths of the first annular electrodes 121 and the second annular electrodes 131 are generally of the micrometer order in a practical application, so shapes of the first annular electrodes 121 and the second annular electrodes 131 still can be equivalent to circular rings after the areas of the second annular electrodes 131 corresponding to the first via holes 1311 are widened, and the areas of the first annular electrodes 121 corresponding to the first via holes 1311 are narrowed. Of course, the shapes of the first annular electrodes 121 and the second annular electrodes 131 can alternatively be ellipses or other shapes which can enable the effect of the lens substrate to be equivalent to that of a Fresnel zone plate in a practical application, although the embodiments of the disclosure will not be limited thereto.

Figure 8A:
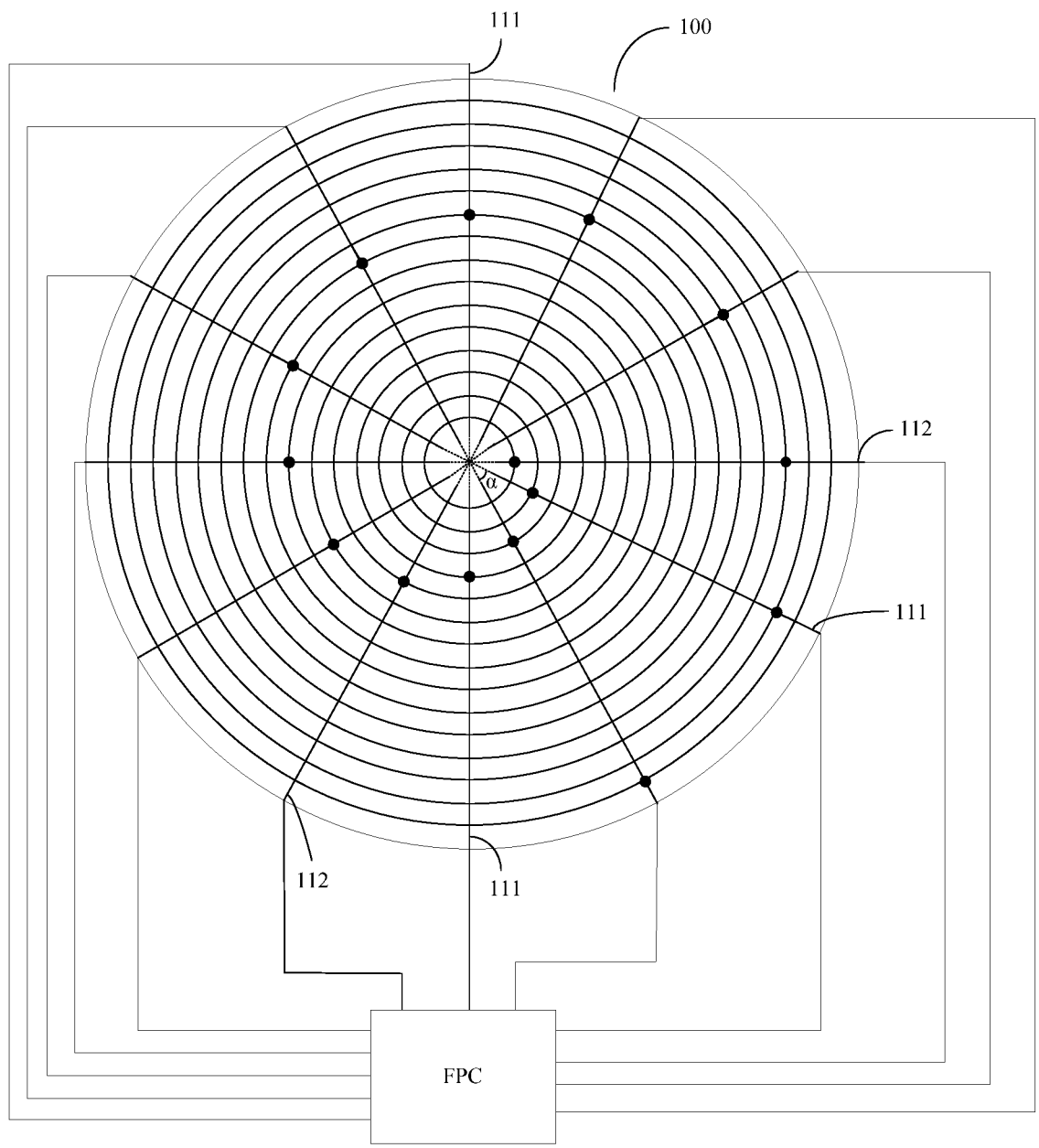
FIG. 8A and FIG. 8B are schematic diagrams respectively of first annular electrodes connected with second wirings, and second annular electrodes connected with first wirings according to the embodiments of the disclosure.
Figure 8B:
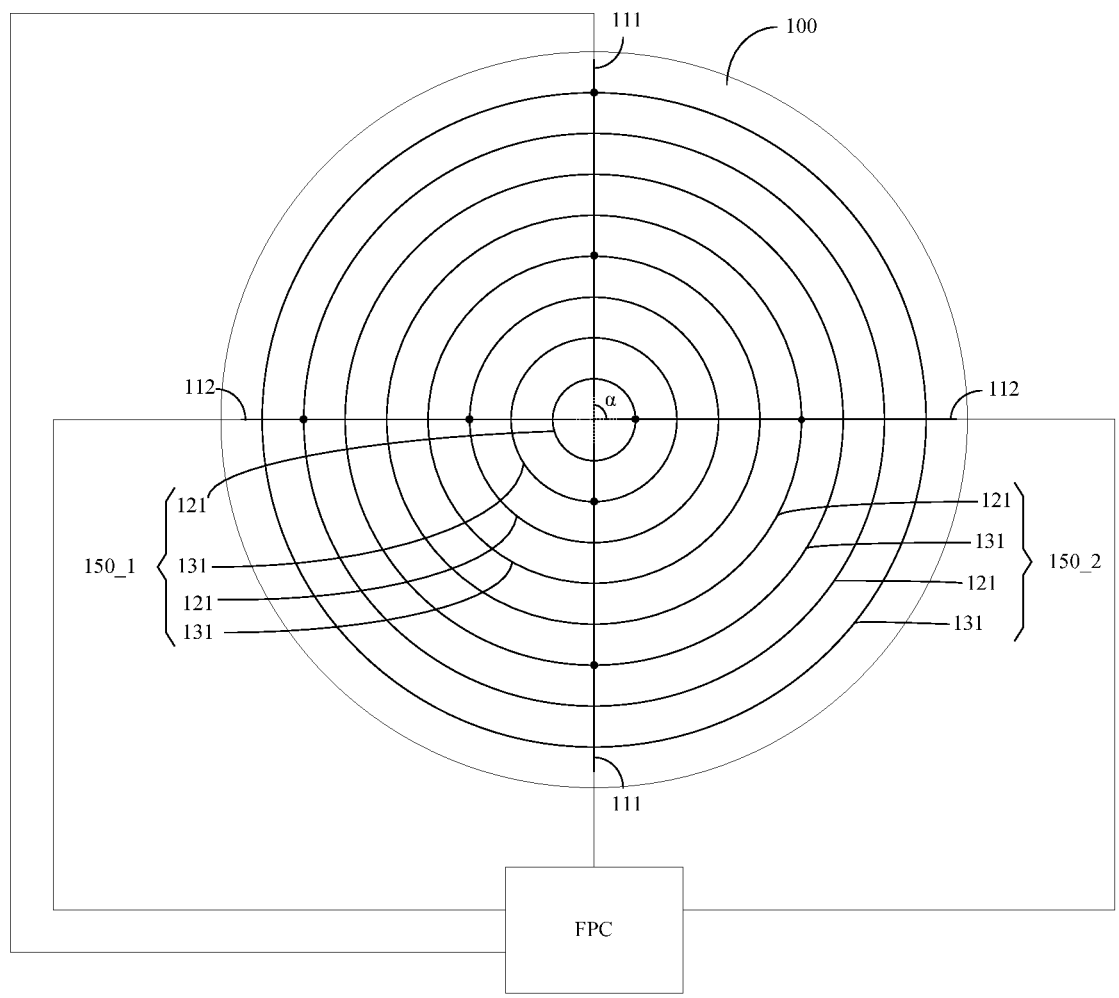

In order to arrange the lens substrate in a step pattern, in some embodiments, in the lens substrate according to the embodiments of the disclosure, as illustrated in FIG. 8A and FIG. 8B (M=2 and N=6 in FIG. 8A, and M=2 and N=2 in FIG. 8B, only by way of an example), all the first annular electrodes 121 and the second annular electrodes 131 can be divided into M electrode groups 150_m (m is an integer greater than or equal to 1, and less than or equal to M), and each electrode group 150_m includes N first annular electrodes 121 and N second annular electrodes 131 with alternately arranged orthographic projections, where M is a positive integer, and N is a positive integer. And with N=1, the lens substrate according to the embodiments of the disclosure is equivalently arranged with two steps; with N=2, the lens substrate according to the embodiments of the disclosure is equivalently arranged with four steps; and with N=3, the lens substrate according to the embodiments of the disclosure is equivalently arranged with six steps; with N=4, the lens substrate according to the embodiments of the disclosure is equivalently arranged with eight steps; and so on with N=5, 6, 7, . . . , although a repeated description thereof will be omitted here.

In some embodiments, in the lens substrate according to the embodiments of the disclosure, as illustrated in FIG. 8A and FIG. 8B, all the n-th second annular electrodes 131 in respective electrode groups 150_m are electrically connected with the same first wiring 111 in a radius direction from a center of the second annular electrodes 131 to an edge thereof, where n is an integer greater than or equal to 1, and less than or equal to N. Therefore, as illustrated in FIG. 8A, a voltage signal can be transmitted to the 1-st second annular electrodes 131 in the electrode groups 150_1 and 150_2 on the 1-st first wiring 111, a voltage signal can be transmitted to the 2-nd second annular electrodes 131 in the electrode groups 150_1 and 150_2 on the second first wiring 111, and so on, although a repeated description thereof will be omitted here. Furthermore, the voltage of the signals transmitted on the respective first wirings 111 is different. In this way, the number of first wirings can be reduced. Alike, as illustrated in FIG. 8B, a voltage signal can be transmitted to the 1-st second annular electrodes 131 in the electrode groups 150_1 and 150_2 on the 1-st first wiring 111, and a voltage signal can be transmitted to the 2-nd second annular electrodes 131 in the electrode groups 150_1 and 150_2 on the second first wiring 111. Furthermore, the voltage of the signals transmitted on the respective first wirings 111 is different. In this way, the number of first wirings can be reduced.

In some embodiments, in the lens substrate according to the embodiments of the disclosure, as illustrated in FIG. 8A and FIG. 8B, all the n-th first annular electrodes 121 in the respective electrode groups 150_m are electrically connected with the same second wiring 112 in the radius direction from the center of the second annular electrodes 131 to the edge thereof, where n is an integer greater than or equal to 1, and less than or equal to N. Therefore, as illustrated in FIG. 8A, a voltage signal can be transmitted to the 1-st first annular electrodes 121 in the electrode groups 150_1 and 150_2 on the 1-st second wiring 112, a voltage signal can be transmitted to the second first annular electrodes 121 in the electrode groups 150_1 and 150_2 on the 2-nd second wiring 112, and so on, although a repeated description thereof will be omitted here. Furthermore, the voltage of the signals transmitted on the respective second wirings 112 is different. In this way, the number of second wirings can be reduced. Alike, as illustrated in FIG. 8B, a voltage signal can be transmitted to the 1-st first annular electrodes 121 in the electrode groups 150_1 and 150_2 on the 1-st second wiring 112, and a voltage signal can be transmitted to the 2-nd first annular electrodes 121 in the electrode groups 150_1 and 150_2 on the 2-nd second wiring 112. Furthermore, the voltage of the signals transmitted on the respective second wirings 112 is different. In this way, the number of first wirings can be reduced.

It shall be noted that, FIG. 8A and FIG. 8B only illustrate the connection relationship between the first wirings and the second annular electrodes, and the connection relationship between the second wirings and the first annular electrodes, and do not illustrate any place-giving patterns, but it shall be appreciated that a part of the first annular electrodes 121 in FIG. 8A and FIG. 8B include place-giving patterns. Of course, M can alternatively take the value of 1, 3, 4, 5, etc., and N can alternatively take the value of 1, 3, 4, 5, etc.; and since the numbers of electrode groups to be arranged in liquid crystal lenses with different degrees are different, the values of M and N can be designed as needed in a practical application, although the embodiments of the disclosure will not be limited thereto.

In some embodiments, a wiring is generally provided with a signal using a flexible printed circuit. For example, as illustrated in FIG. 8A and FIG. 8B, respective first wirings 111 and respective second wirings 112 are connected respectively with a Flexible Printed Circuit (FPC) to input corresponding voltage signals to the first annular electrodes 121 and the second annular electrodes 131 through the FPC.

In some embodiments, as illustrated in FIG. 8A and FIG. 8B, the respective first wirings 111 and the respective second wirings 112 extend respectively in the radius direction from the center of the second annular electrodes 131 to the edge thereof, where no less than one second wiring 112 is arranged between adjacent first wirings 111. For example, as illustrated in FIG. 8A and FIG. 8B, the first wirings 111 and the second wirings 112 are arranged alternately, that is, one second wiring 112 is arranged between any two adjacent first wirings 111. Furthermore, there is the same angle α between reverse extension lines of orthographic projections of each pair of adjacent first and second wirings 111 and 112 onto the base substrate 100. That is because, in order to avoid the first wirings 111 from being electrically connected, and thus short-circuited, with the second wiring 112, the first wirings 111 shall not intersect with the second wiring 112, accordingly, a reverse extension line of an orthographic projection of a first wiring 111 onto the base substrate 100 refers to such a part of the orthographic projection of the first wiring 111 that extends in a radius direction from the edge of the second annular electrodes 131 to the center thereof, and a reverse extension line of an orthographic projection of a second traveling 112 onto the base substrate 100 refers to such a part of the orthographic projection of the second traveling 112 that extends in the radius direction from the edge of the second annular electrodes 131 to the center thereof. It shall be noted that, an extension part is not really fabricated, but only indicates that the first wirings 111 and the second wirings 112 are uniformly arranged on the base substrate 100, so that the first via holes and the second via holes can be distributed uniformly on the base substrate 100 in a helical pattern to thereby provide a preferable focal length of the liquid crystal lens.

Figure 9:
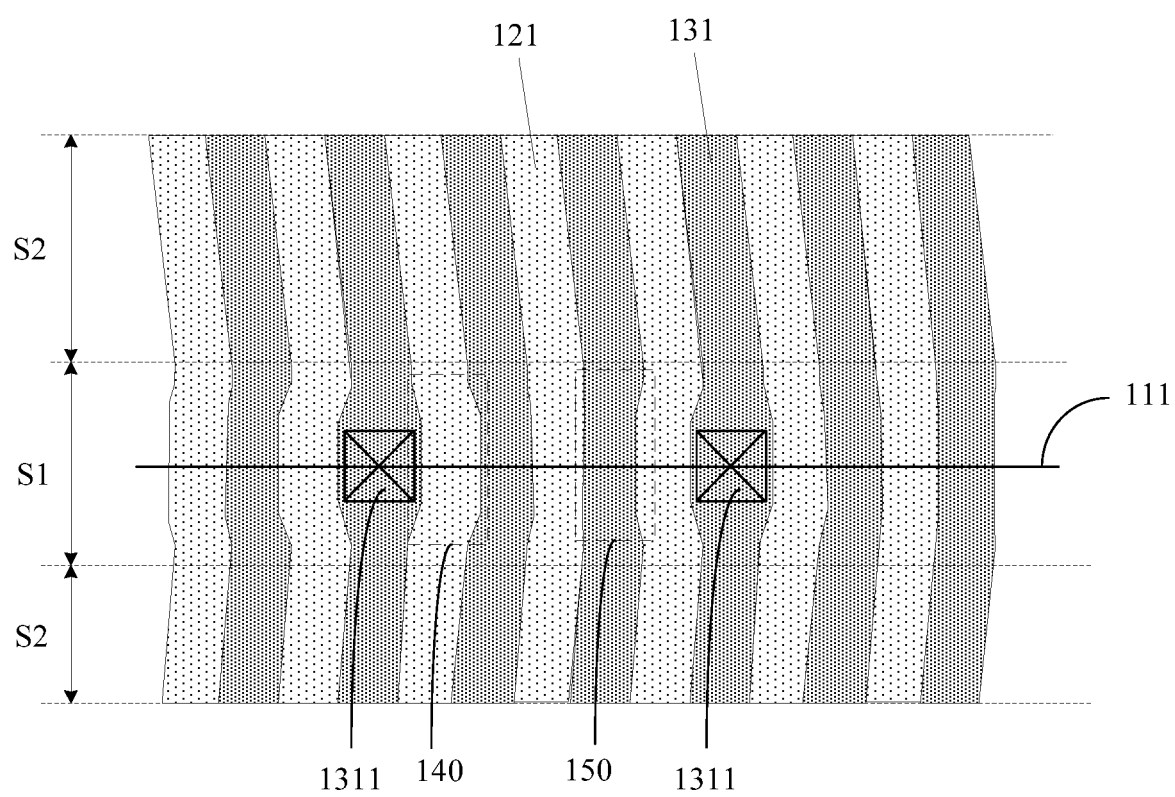
FIG. 9 is a fourth schematic structural diagram of the lens substrate according to the embodiments of the disclosure in a top view.

In order to achieve an equivalent effect to that of a Fresnel zone plate, in some embodiments, in the lens substrate according to the embodiments of the disclosure, as illustrated in FIG. 9 (where eight steps are arranged by way of an example), for example, S1 represents an area where a place-giving pattern 140 of a first annular electrode 121 is located, and S2 represents the other area than the area where the place-giving pattern 140 corresponding to the first annular electrode 121 is located. A width of each first annular electrode 121 in the area S1 corresponding to the place-giving pattern 140 is less than a width thereof in the area S2, that is, the width of the first annular electrode 121 in the area S1 is adjusted, and the widths of each first annular electrode 121 and each second annular electrode 131 in the area S2 are not adjusted. Furthermore in some embodiments, the widths of each first annular electrode and each second annular electrode in the area S2 can be set in a step pattern according to the equation of $d_j$.

In some embodiments, in the lens substrate according to the embodiments of the disclosure, all the first annular electrodes 121 between first via holes 1311 corresponding to the same first wiring 111 include place-giving patterns 140 as illustrated in FIG. 9, so that a space to be reserved in a first annular electrode 121 to be arranged with a place-giving pattern is allotted among the other first annular electrodes 121, and thus the widths of the first annular electrodes 121 in the area S1 corresponding to the place-giving patterns 140 can be approximately $d_j$.

Furthermore, in order to enable the first annular electrodes to be distributed more uniformly, in some embodiments, in the lens substrate according to the embodiments of the disclosure, as illustrated in FIG. 9, for respective place-giving patterns 140 between first via holes 1311 corresponding to the same first wiring 111, widths of the respective place-giving patterns 140 in the area S1, and widths of gaps 150 between every two adjacent place-giving patterns 14 in the area S1 are arranged sequentially at a preset proportion in the radius direction from the center of the second annular electrodes 131 to the edge thereof, where the orthographic projections of the first annular electrodes 121 onto the base substrate abut with the orthographic projections of the second annular electrodes 131 onto the base substrate so that a width of a gap 150 between any two adjacent place-giving patterns 140 can be equivalent to a width of a second annular electrode 131 in the area S1. In this way, the widths of the first annular electrodes 121 and the second annular electrodes 131 in the area S1 can be equivalently arranged sequentially on the base substrate at the preset proportion.

In some embodiments, the preset proportion can be derived empirically. Of course, the preset proportion can alternatively be set according to the step pattern. For example, when an electrode group includes two first annular electrodes and two second annular electrodes in a four-step pattern, the preset proportion can be $t_1:t_2:t_3:t_4$. When an electrode group includes three first annular electrodes and three second annular electrodes, the preset proportion can be $t_1:t_2:t_3:t_4:t_5:t_6$. The same description will apply when the numbers of first annular electrodes and second annular electrodes in an electrode group are 4, 5, 6 . . . respectively, although a repeated description thereof will be omitted here. Further, the preset proportion can be designed as needed in a practical fabrication process, which needs to be determined according to a practical application, although the embodiments of the disclosure will not be limited thereto.

In some embodiments, the preset proportion is set to be 1, and as illustrated in FIG. 9, for respective place-giving patterns 140 between first via holes 1311 corresponding to the same first wiring 111, i.e., the place-giving patterns 140 in the area S1, widths of the respective place-giving patterns 140 are the same as widths of gaps 150 between every two adjacent place-giving patterns 140, where the orthographic projections of the first annular electrodes 121 onto the base substrate abut with the orthographic projections of the second annular electrodes 131 onto the base substrate so that a width of a gap 150 between any two adjacent place-giving patterns 140 can be equivalent to a width of a second annular electrode 131 in the area S1. In this way, the widths of the first annular electrodes 121 and the second annular electrodes 131 in the area S1 can be arranged sequentially on the base substrate at an equal proportion so that a space to be reserved for a first via hole can be allotted uniformly among the other place-giving patterns. Taking six steps as an example, with $\lambda=0.56$ μm, the degree of the lens is 285, and the focal length is 350 μm, there is such an electrode group that widths of first annular electrodes in the group can be 3.93 μm, 3.92 μm, and 3.92 μm, and widths of second annular electrodes therein can be 3.92 μm, 3.92 μm, and 3.92 μm, so a total width of the electrode group is 23.53 μm; and when an area of a second annular electrode 131 corresponding to a first via hole 1311 increases in width to 5.6 μm, a width of a remaining space is 17.93 μm; widths of the other first and second annular electrodes in the area S1 are set to the same width, i.e., 3.586 μm, so that the remaining space can be allotted equally among these annular electrodes.

Based upon the same inventive concept, the embodiments of the disclosure further provide a liquid crystal lens including the lens substrate according to the embodiments of the disclosure. The liquid crystal lens addresses the problem under a similar principle to the lens substrate above, so reference can be made to the implementation of the lens substrate above for an implementation of the liquid crystal lens, and a repeated description thereof will be omitted here.

In some embodiments, the liquid crystal lens according to the embodiments of the disclosure further includes an opposite substrate arranged opposite to the lens substrate, and a liquid crystal layer located between the lens substrate and the opposite substrate. Where a common electrode can be arranged on the opposite substrate. In a practical application, the first annular electrodes are provided with a signal via the second wirings, the second annular electrodes are provided with a signal via the first wirings, and the common electrode is provided with a signal, so that liquid crystal molecules are driven to change their arrangement order, and thus the liquid crystal lens can be equivalent to a Fresnel zone plate, and function as a lens of a glasses.

Based upon the same inventive concept, the embodiments of the disclosure further provide a liquid crystal glasses including the liquid crystal lens above according to the embodiments of the disclosure. The liquid crystal glasses addresses the problem under a similar principle to the liquid crystal lens above, so reference can be made to the implementation of the liquid crystal lens above for an implementation of the liquid crystal glasses, and a repeated description thereof will be omitted here.

In some embodiments, in the liquid crystal glasses according to the embodiments of the disclosure, the liquid crystal glasses further include: a detection circuit and a control circuit, where the detection circuit is configured to detect a distance between the liquid crystal glasses and an eyeball of a human eye, and to transmit the detected distance to the control circuit; the control circuit is configured to determine a focal length of the human eye according to the detected distance, and to determine voltage to be provided to respective first annular electrodes and respective second annular electrodes according to the focal length of the human eye to control a focal length of the liquid crystal glasses. In this way, the liquid crystal glasses can match with the eyesight of the human eye.

In some embodiments, in the liquid crystal glasses according to the embodiments of the disclosure, the detection circuit includes a plurality of distance sensors, and the control circuit includes a Flexible Printed Circuit (FPC).

In the lens substrate, the liquid crystal lens, and the liquid crystal glasses according to the embodiments of the disclosure, the first annular electrodes are arranged concentric with the second annular electrodes, and the orthographic projections of the first annular electrodes onto the base substrate and the orthographic projections of the second annular electrodes onto the base substrate are arranged alternately, so that the effect of the lens substrate is equivalent to that of a Fresnel zone plate. Furthermore, at least the first annular electrodes adjacent to a part of the first via holes include place-giving patterns in areas corresponding to the part of the first via holes, and the smallest spacing between the place-giving patterns and their corresponding first via holes is no less than a preset distance, so that when the second annular electrodes become narrow, the place-giving patterns are arranged to reserve areas with an appropriate size for the first via holes, so the first via holes can be fabricated without exposing the first annular electrodes, to thereby avoid the electrodes from being short-circuited, so as to improve the degree of the liquid crystal lens.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A lens substrate, applicable to a liquid crystal lens, comprising:
    a base substrate; and
    a wiring layer, a first annular electrode layer, and a second annular electrode layer arranged in a stack on the base substrate in that order;
    wherein the wiring layer comprises a plurality of first wirings, the first annular electrode layer comprises a plurality of first annular electrodes, and the second annular electrode layer comprises a plurality of second annular electrodes; and respective first annular electrodes are arranged concentric with respective second annular electrodes, and orthographic projections of the plurality of first annular electrodes onto the base substrate, and orthographic projections of the plurality of second annular electrodes onto the base substrate are arranged alternately;
    wherein the plurality of first wirings are electrically connected with the plurality of second annular electrodes through first via holes, wherein at least a first annular electrode adjacent to a part of the first via holes comprises a place-giving pattern in an area corresponding to the part of the first via holes, and a smallest spacing between the place-giving pattern and its corresponding first via hole is no less than a preset distance.

2. The lens substrate according to claim 1, wherein a width, of a first annular electrode comprising a place-giving pattern, in an area corresponding to the place-giving pattern is less than that of the first annular electrode in the other area.

3. The lens substrate according to claim 2, wherein a width of each of the plurality of second annular electrodes in an area corresponding to a corresponding first via hole is greater than that of the each of the plurality of second annular electrodes in the other area.

4. The lens substrate according to claim 3, wherein the orthographic projections of the plurality of first annular electrodes onto the base substrate abut with the orthographic projections of the plurality of second annular electrodes onto the base substrate.

5. The lens substrate according to claim 1, wherein all of the plurality of first annular electrodes and the plurality of second annular electrodes are divided into M electrode groups, and each of the M electrode groups comprises N first annular electrodes and N second annular electrodes with alternately arranged orthographic projections, wherein M is a positive integer, and N is a positive integer; and
    all of n-th second annular electrodes in respective electrode groups are electrically connected with a same first wiring in a radius direction from a center of the plurality of second annular electrodes to an edge thereof, wherein n is an integer greater than or equal to 1, and less than or equal to N.

6. The lens substrate according to claim 5, wherein for respective place-giving patterns between first via holes corresponding to the same first wiring, widths of the respective place-giving patterns, and widths of gaps between every two adjacent place-giving patterns are arranged sequentially at a preset proportion in the radius direction from the center of the plurality of second annular electrodes to the edge thereof.

7. The lens substrate according to claim 5, wherein for respective place-giving patterns between first via holes corresponding to the same first wiring, widths of the respective place-giving patterns are same as widths of gaps between every two adjacent place-giving patterns.

8. The lens substrate according to claim 5, wherein all of first annular electrodes between first via holes corresponding to the same first wiring comprise place-giving patterns.

9. The lens substrate according to claim 1, wherein a first annular electrode most adjacent to the part of the first via holes comprises a place-giving pattern in an area corresponding to the part of the first via holes.

10. The lens substrate according to claim 5, wherein the wiring layer further comprises a plurality of second wirings arranged insulated from the plurality of first wirings; and
    all of n-th first annular electrodes in the respective electrode groups are electrically connected with a same second wiring in the radius direction from the center of the plurality of second annular electrodes to the edge thereof.

11. The lens substrate according to claim 10, wherein respective first wirings and respective second wirings extend respectively in the radius direction from the center of the plurality of second annular electrodes to the edge thereof; and
    the plurality of first wirings and the plurality of second wirings are arranged alternately, and a same angle is set between reverse extension lines of orthographic projections of each pair of adjacent first and second wirings onto the base substrate.

12. The lens substrate according to claim 10, wherein a width of each of the plurality of first annular electrodes in an area corresponding to a corresponding second via hole is greater than that of the each of the plurality of first annular electrodes in the other area.

13. A liquid crystal lens, comprising a lens substrate, wherein the liquid crystal lens comprises:
    a base substrate; and
    a wiring layer, a first annular electrode layer, and a second annular electrode layer arranged in a stack on the base substrate in that order;
    wherein the wiring layer comprises a plurality of first wirings, the first annular electrode layer comprises a plurality of first annular electrodes, and the second annular electrode layer comprises a plurality of second annular electrodes; and respective first annular electrodes are arranged concentric with respective second annular electrodes, and orthographic projections of the plurality of first annular electrodes onto the base substrate, and orthographic projections of the plurality of second annular electrodes onto the base substrate are arranged alternately;
    wherein the plurality of first wirings are electrically connected with the plurality of second annular electrodes through first via holes, wherein at least a first annular electrode adjacent to a part of the first via holes comprises a place-giving pattern in an area corresponding to the part of the first via holes, and a smallest spacing between the place-giving pattern and its corresponding first via hole is no less than a preset distance.

14. The liquid crystal lens according to claim 13, wherein a width, of a first annular electrode comprising a place-giving pattern, in an area corresponding to the place-giving pattern is less than that of the first annular electrode in the other area.

15. The liquid crystal lens according to claim 14, wherein a width of each of the plurality of second annular electrodes in an area corresponding to a corresponding first via hole is greater than that of the each of the plurality of second annular electrodes in the other area.

16. The liquid crystal lens according to claim 13, wherein all of the plurality of first annular electrodes and the plurality of second annular electrodes are divided into M electrode groups, and each of the M electrode groups comprises N first annular electrodes and N second annular electrodes with alternately arranged orthographic projections, wherein M is a positive integer, and N is a positive integer; and all of n-th second annular electrodes in respective electrode groups are electrically connected with a same first wiring in a radius direction from a center of the plurality of second annular electrodes to an edge thereof, wherein n is an integer greater than or equal to 1, and less than or equal to N.

17. The liquid crystal lens according to claim 16, wherein for respective place-giving patterns between first via holes corresponding to the same first wiring, widths of the respective place-giving patterns, and widths of gaps between every two adjacent place-giving patterns are arranged sequentially at a preset proportion in the radius direction from the center of the plurality of second annular electrodes to the edge thereof.

18. The liquid crystal lens according to claim 13, wherein a first annular electrode most adjacent to the part of the first via holes comprises a place-giving pattern in an area corresponding to the part of the first via holes.

19. A liquid crystal glasses, comprising the liquid crystal lens according to claim 13.

20. The liquid crystal glasses according to claim 19, wherein the liquid crystal glasses further comprise: a detection circuit and a control circuit, wherein:

the detection circuit is configured to detect a distance between the liquid crystal glasses and an eyeball of a human eye, and to transmit the distance to the control circuit; and the control circuit is configured to determine a focal length of the human eye according to the distance, and to determine voltage to be provided to the respective first annular electrodes and the respective second annular electrodes according to the focal length of the human eye to control a focal length of the liquid crystal glasses.

* * * * *